United States Patent
Kennedy (10) Patent No.: US 10,299,469 B2
(45) Date of Patent: May 28, 2019

(54) CUSHIONED HORSESHOE

(76) Inventor: Paul Kennedy, Horseheads, NY (US)

( * ) Notice: Subject to any disclaimer, the term of this patent is extended or adjusted under 35 U.S.C. 154(b) by 490 days.

(21) Appl. No.: 13/092,211

(22) Filed: Apr. 22, 2011

(65) Prior Publication Data
US 2012/0267124 A1  Oct. 25, 2012

(51) Int. Cl.
*A01L 1/04* (2006.01)
*A01L 7/02* (2006.01)

(52) U.S. Cl.
CPC .. *A01L 1/04* (2013.01); *A01L 7/02* (2013.01)

(58) Field of Classification Search
CPC ..................................... A01L 1/04; A01L 5/00
USPC ......................................... 168/12, 13, 14, 26
See application file for complete search history.

(56) References Cited

U.S. PATENT DOCUMENTS

| | | |
|---|---|---|
| 9,173 A | 8/1852 | Jones |
| 28,656 A | 6/1860 | Coleman |
| 188,620 A | 3/1877 | Going |
| 458,051 A | 8/1891 | Hitch |
| 514,934 A | 2/1894 | Jones |
| 602,046 A | 4/1898 | Hitch |
| 619,745 A | 2/1899 | Hitch |
| 626,091 A | 5/1899 | Peter et al. |
| 641,210 A | 1/1900 | Jones |
| 649,231 A | 5/1900 | Winquist |
| 822,949 A | 6/1906 | Hubbard |
| 924,790 A | 6/1909 | Kane |
| 2,094,743 A | 10/1937 | Kearney |
| 2,103,718 A | 12/1937 | Goodwin |
| 3,023,812 A | 3/1962 | Swartz |
| 5,105,891 A | 4/1992 | Noffsinger |
| 5,348,098 A | 9/1994 | DiGiulio |
| 5,740,866 A | 4/1998 | Bergstrom et al. |
| 6,443,232 B1 | 9/2002 | Moller et al. |
| 6,810,962 B2 | 11/2004 | Moller et al. |
| 2007/0068682 A1* | 3/2007 | McKinlay ........................ 168/12 |
| 2011/0079346 A1* | 4/2011 | Strickland ..................... 156/192 |

FOREIGN PATENT DOCUMENTS

WO   WO 9965298 A1 *  12/1999   ............... A01L 5/00

* cited by examiner

*Primary Examiner* — Son T Nguyen
(74) *Attorney, Agent, or Firm* — Stanzione & Associates, PLLC; Patrick Stanzione (57) ABSTRACT

A cushioned horseshoe for use with a hoofed animal including a hoof contacting shoe with a top surface in contact with the hoof and a bottom surface comprising an integrally formed raised portion; and a plurality of nail holes extending from the top surface to the bottom surface of the hoof contacting shoe to receive nails; and a ground contacting shoe including a top surface comprising a recessed portion for receiving the raised portion of the hoof contacting shoe, a bottom surface for contact with a ground surface, and a through slot extending from the top surface to the bottom surface of the ground contacting shoe. Between the ground contacting shoe and the hoof contacting shoe is a pad between the bottom surface of the hoof contacting shoe and the top surface of the ground contact shoe, bonded to the bottom surface and the top surface with a rubber-tearing bond.

11 Claims, 8 Drawing Sheets

CUSHIONED HORSESHOE

BACKGROUND OF THE INVENTION

Field of the Invention

The invention pertains to the field of horseshoes. More particularly, the invention pertains to a cushioned horseshoe.

Description of Related Art

Cushioned horseshoes are used to aid in absorbing the impact of the hoof with the ground. Some cushioned horseshoes have an upper and a lower metal shoe, with a resilient cushion between. The upper and lower shoes are often held together by screws or rivets, with the cushion between. Other cushioned horseshoes only have a lower metal shoe with a rubber pad of at least 90 durometer.

In most of the prior art cushioned horseshoe designs, the nails which hold the shoe against the horse's hoof are driven into holes in the lower (ground-contacting) shoe, so that the nails press against the ground-contacting surface of the shoe, as in a conventional non-cushioned horseshoe. Therefore, every time the animal takes a step the cushion is compressed between the upper and lower shoe. This causes the lower surface of the shoe to be released from the nail as the cushion is compressed, and then to contact the surface as the hoof is lifted and the cushion rebounds. This gradually works the nails out, causing loss of the shoe.

Where screws or rivets are used, the shoe will have the same working problem on the screws or rivets as on the nails in the nailed-through shoes when the cushion is compressed, and the heads of the screws or rivets which are on the ground-contacting surface of the shoe will also wear against the ground. These effects will cause the cushioned horseshoe to fall apart as the rivets or screws are lost. Also, dirt will build up under the screw or nail heads when the cushion is compressed, limiting the amount of rebound possible, and eventually eliminating the cushioning effect.

Some prior art cushioned horseshoes avoided the nail-working problem by putting a slot in the lower shoe, so that the nail passes through the lower shoe and presses against the upper shoe and, in some cases, the rubber cushion.

In two-piece cushioned horseshoes where the upper and lower shoes are held together by screws or rivets, it is not possible to cold-size the shoe in one piece. The upper and lower shoes must be sized separately, and after that it is very difficult to get the holes for the screws or rivets to line up again.

U.S. Pat. No. 2,103,718, issued in 1937 to Goodwin, is a cushioned horseshoe in which the rubber cushion is vulcanized against the upper and lower shoes. Goodwin's shoe uses vertical flanges (see FIGS. 2, 4 5 and 8) which protrude from the lower shoe along inside and outside edges of the upper shoe, which cause metal-to-metal contact between the upper and lower shoes. The shoe lacks interlocking internal flanges and recesses on the upper and lower shoes to limit relative movement.

SUMMARY OF THE INVENTION

In one embodiment, a cushioned horseshoe for use with an animal having a hoof including a U-shaped hoof contacting shoe and a U-shaped ground contacting shoe is disclosed. The hoof contacting shoe has a first branch and a second branch connected by a toe portion, the first branch and second branch each comprising a side portion adjacent the toe portion, and a quarter portion adjacent the side portion; a top surface in contact with the hoof; a bottom surface comprising an integrally formed raised portion; and a plurality of nail holes extending from the top surface to the bottom surface of the hoof contacting shoe to receive nails. The ground contacting shoe has a first branch and a second branch connected by a toe portion, the first branch and second branch each comprising a side portion adjacent the toe portion, and a quarter portion adjacent the side portion; a top surface comprising a recessed portion for receiving the raised portion of the hoof contacting shoe, a bottom surface for contact with a ground surface, and a first series of holes spaced apart a distance on the first branch and a second series of holes spaced apart a distance on the second branch where the first and second series of holes extend from the top surface to the bottom surface of the ground contacting shoe. Between the ground contacting shoe and the hoof contacting shoe is a pad between the bottom surface of the hoof contacting shoe and the top surface of the ground contact shoe, bonded to the bottom surface and the top surface with a rubber-tearing bond. The rubber pad is trapped between the integrally formed raised portion and the recessed portion of the shoes.

In another embodiment is a method of making a cushioned horseshoe comprising the steps of: applying adhesive to an uncured rubber pad; aligning and applying an uncured rubber pad substantially U-shaped to either the top surface of the ground contacting shoe or the bottom surface of the hoof contacting shoe; aligning and applying an other of the top surface of the ground contacting shoe or the bottom surface of the hoof contacting shoe to the uncured rubber pad; inserting the ground contacting shoe and the hoof contacting shoe into molds with pins and curing the uncured rubber pad, such that the rubber pad is bonded to the top surface of the ground contacting shoe and the bottom surface of the hoof contacting shoe and the pins of the molds create holes in the rubber pads.

DETAILED DESCRIPTION OF THE INVENTION

FIGS. 1-9d show a cushioned horseshoe 2 of an embodiment of the present invention. The cushioned horseshoe 2 has a pair of U-shaped shoes or plates 10, 20 which are separated by and bonded to a pad 15 formed of a flexible material. One of the U-shaped shoes 10 contacts the ground and the other U-shaped shoe 20 is contact with the hoof 30 of the animal. The U-shaped shoes 10, 20 each have two legs or branches 4 which are connected to each other through a toe portion 8 (see FIG. 3). Each branch 4 further comprises a side wall portion 6 adjacent to the toe portion 8 and a quarter portion 7 adjacent the side wall portion 6. At the ends of each of the U-shaped branches 4 are heels 5.

Referring to FIGS. 1 2, 3, 4, 5, 7, 8, 9a-9d, a ground contacting shoe 10 of the cushioned horseshoe 2 has a top surface 12 in contact with the pad 15 and a bottom surface 11 that contacts the ground when attached to the hoof 30 of an animal. The top surface 12 of the ground contacting shoe 10 also has an integrally formed recess or key 14 that is present on the quarter portion 7 and side wall portion 6 of each of the branches 4 of the ground contacting shoe 10. Each recess 14 includes tapered ends 14a that extend toward each other as the tapered ends extend into the top surface 12 of the ground contacting shoe 10 (See FIGS. 3-5 and 7). The ground contacting shoe 10 also has a plurality of nail holes 29 extending along each branch's 4 side wall portions 6 and quarter portion 7 of the shoe to receive nails 28. Each of the plurality of nail holes 29 is formed to have a predetermined size such that a body and head of the nail 28 extends fully through the hole 29 (See FIGS. 7 and 8). The flexible pad 15 also includes holes that correspond with and have the same or similar size as the holes 29 so that the body and head of a nail 28 extends therethrough (See FIGS. 7 and 8).

Figure 1:
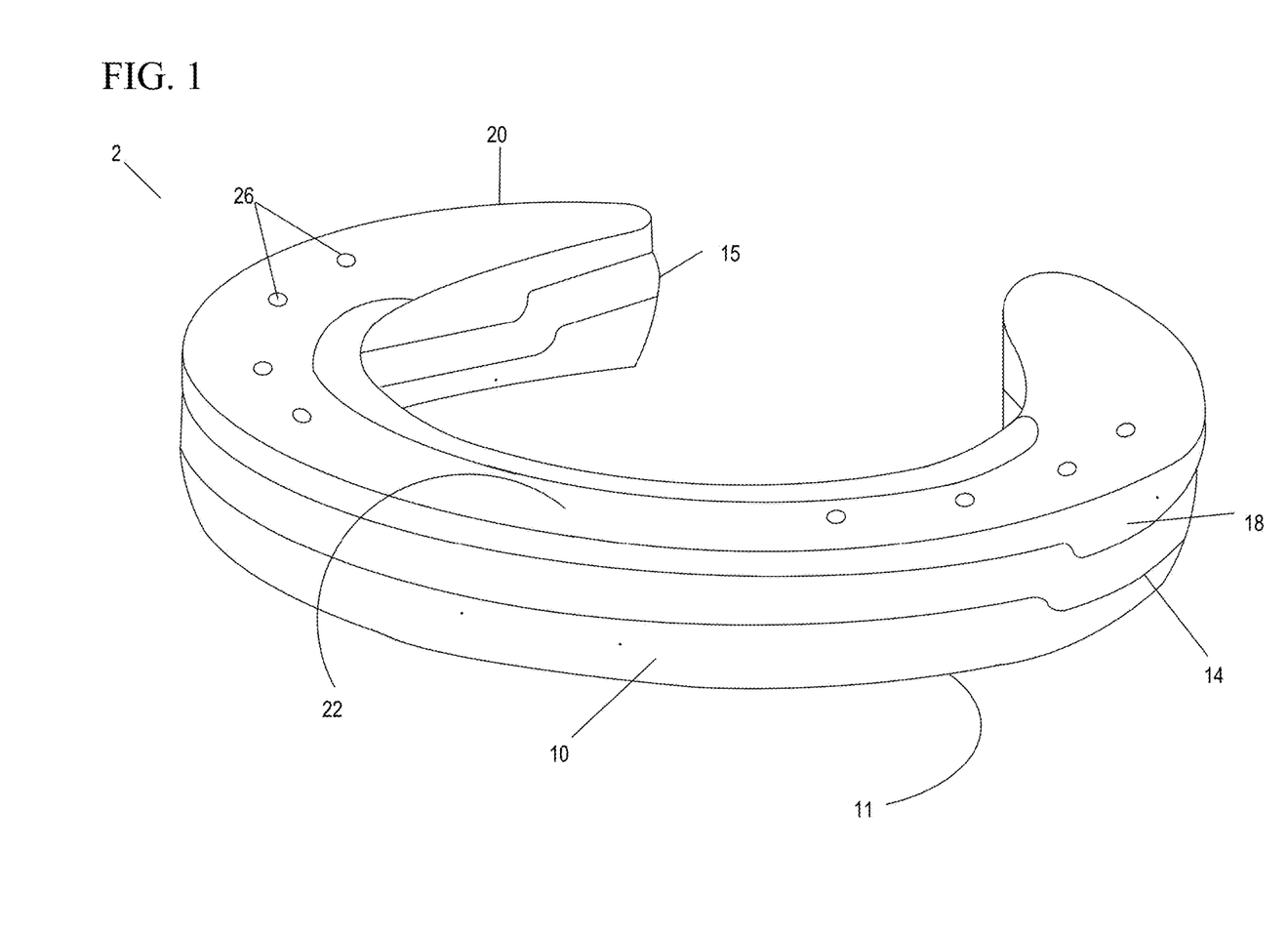
FIG. 1 shows perspective view of an assembled one-piece cushioned horse shoe.
Figure 2:
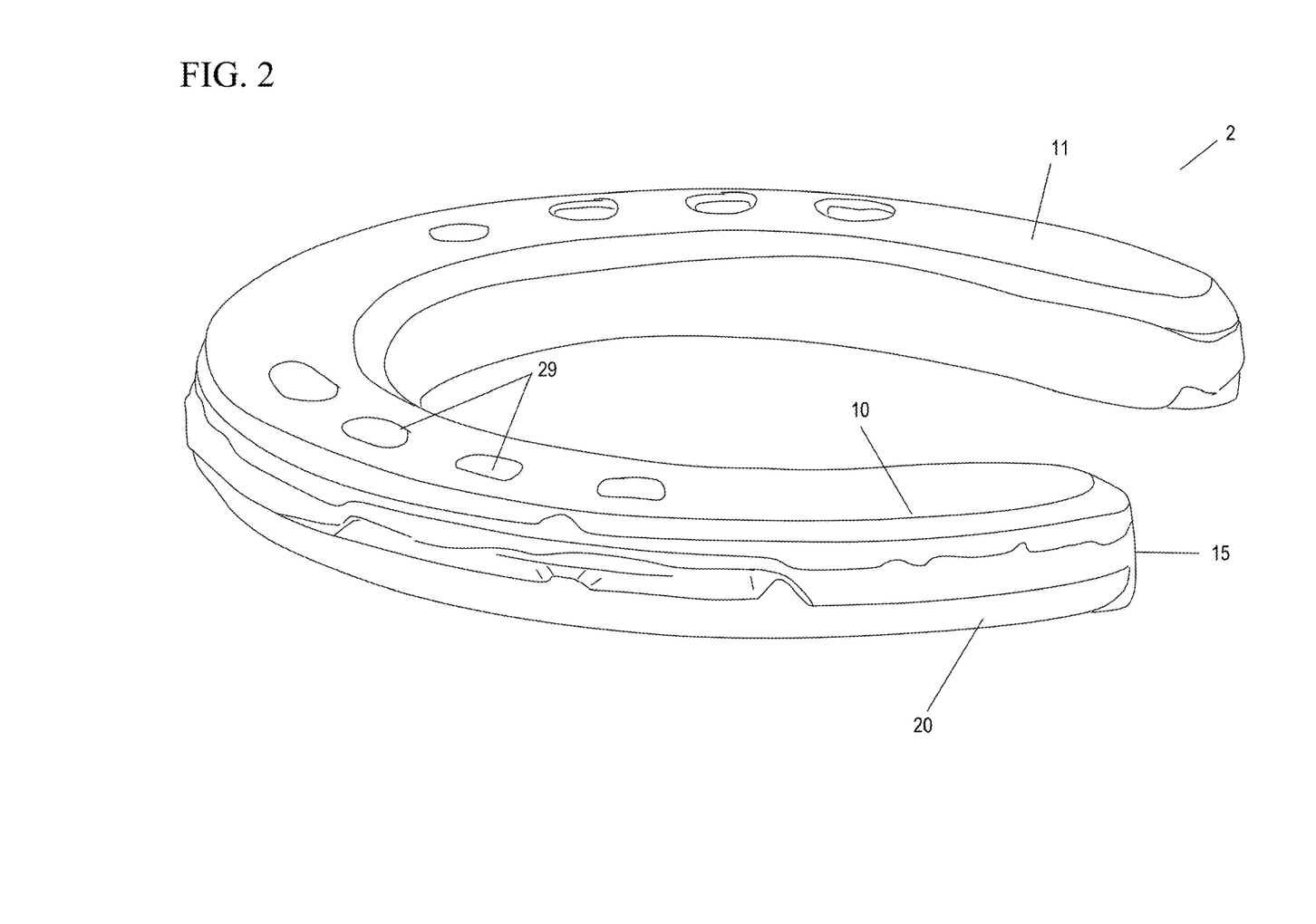
FIG. 2 shows another perspective view of an assembled one-piece cushioned horse shoe.
Figure 3:
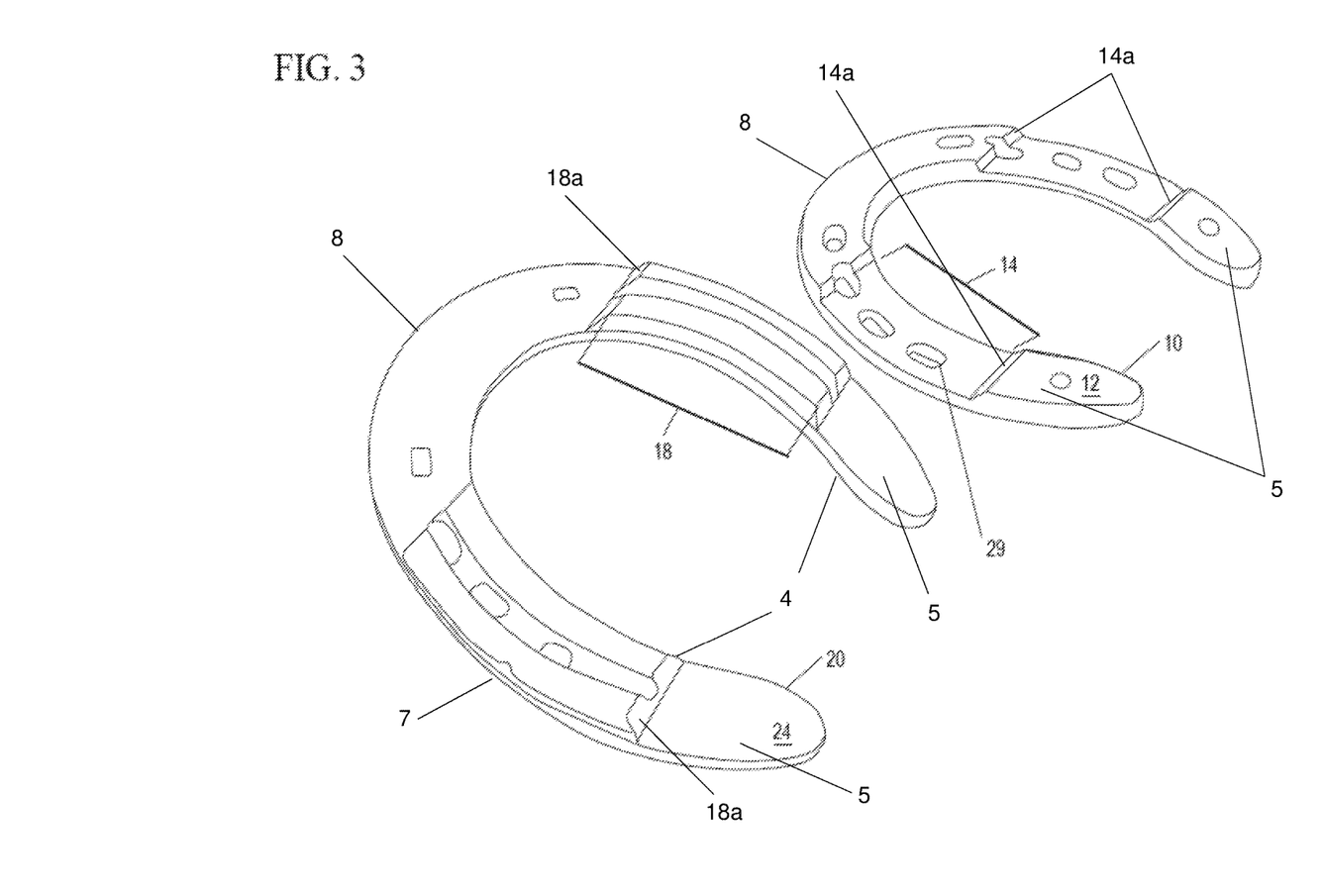
FIG. 3 shows a bottom surface of a hoof contact shoe and a top surface of a ground contacting shoe.
Figure 4:
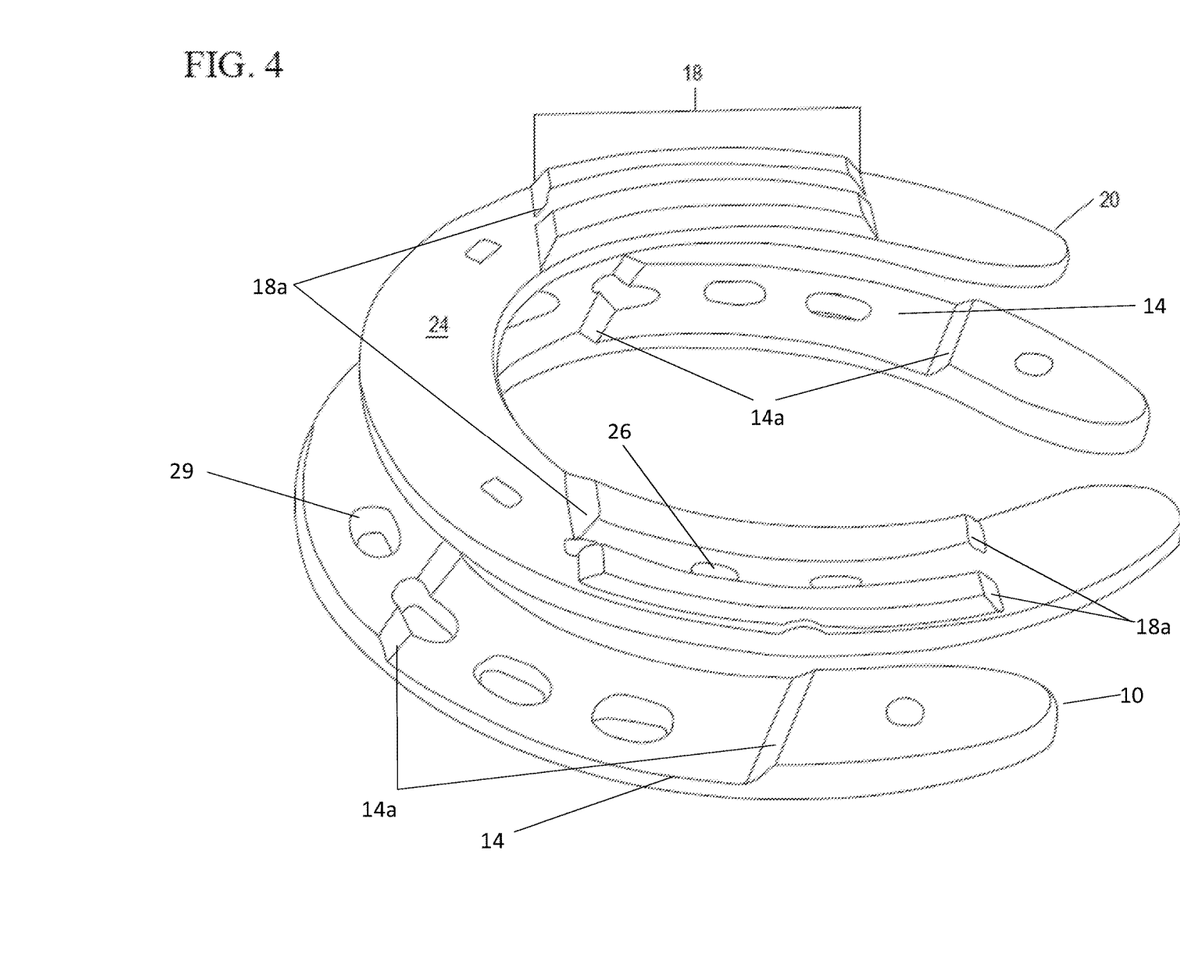
FIG. 4 shows a bottom surface of a hoof contact shoe.
Figure 5:
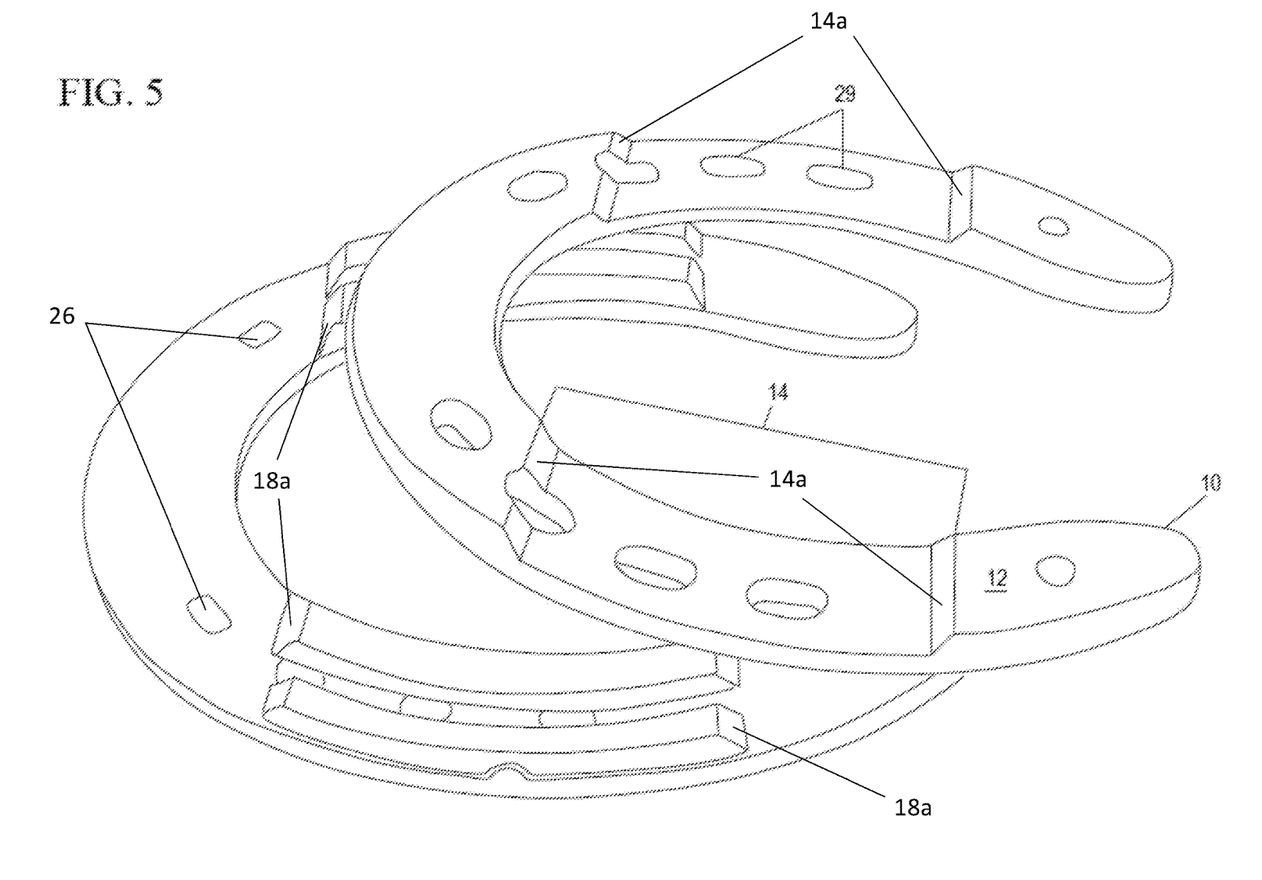
FIG. 5 shows a top surface of a ground contacting shoe.
Figure 6:
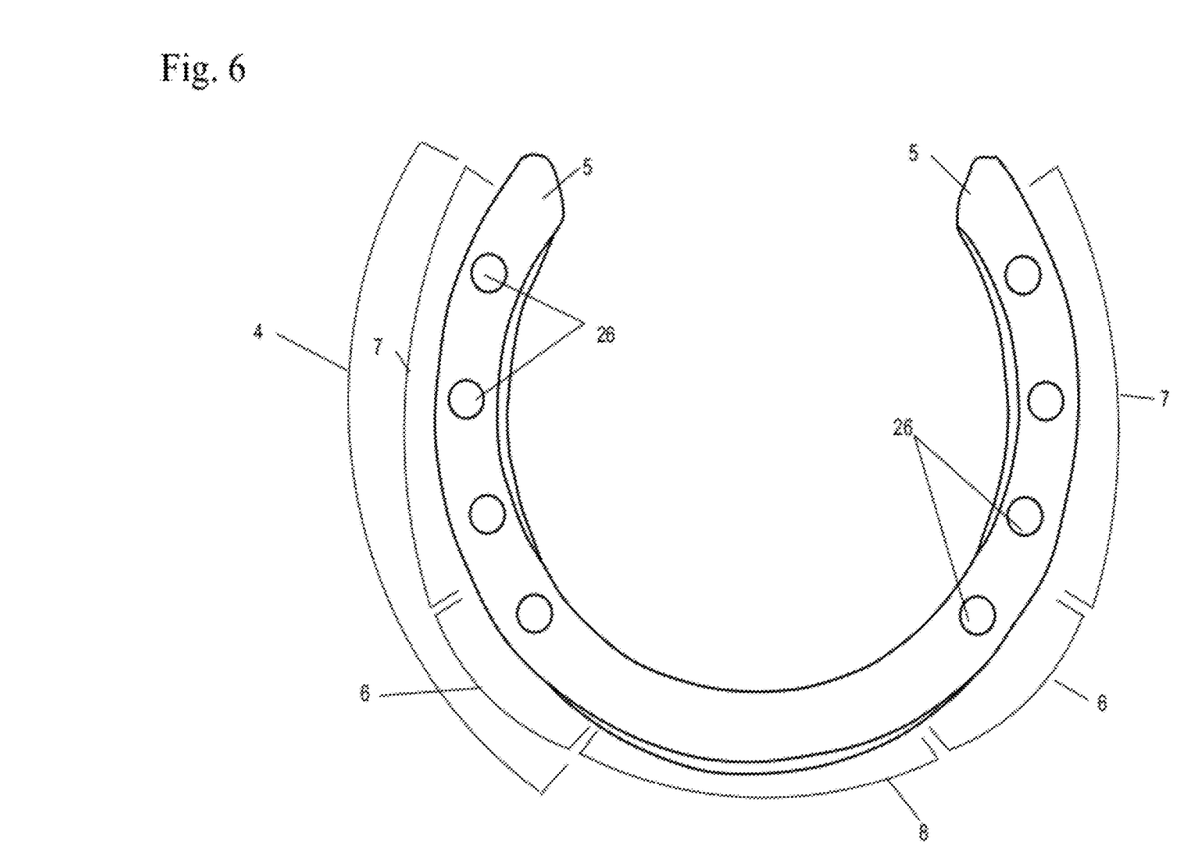
FIG. 6 shows a top view of a shoe.
Figure 7:
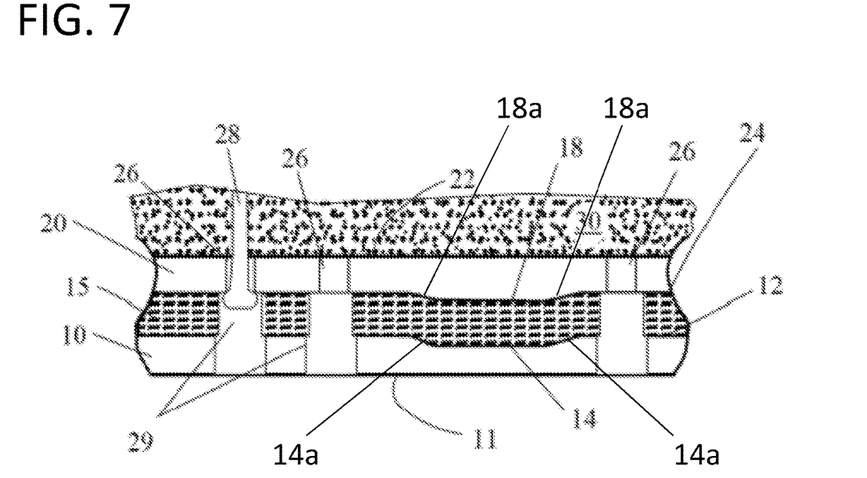
FIG. 7 shows a sectional view of the cushioned horseshoe relative to the hoof of an animal.
Figure 8:
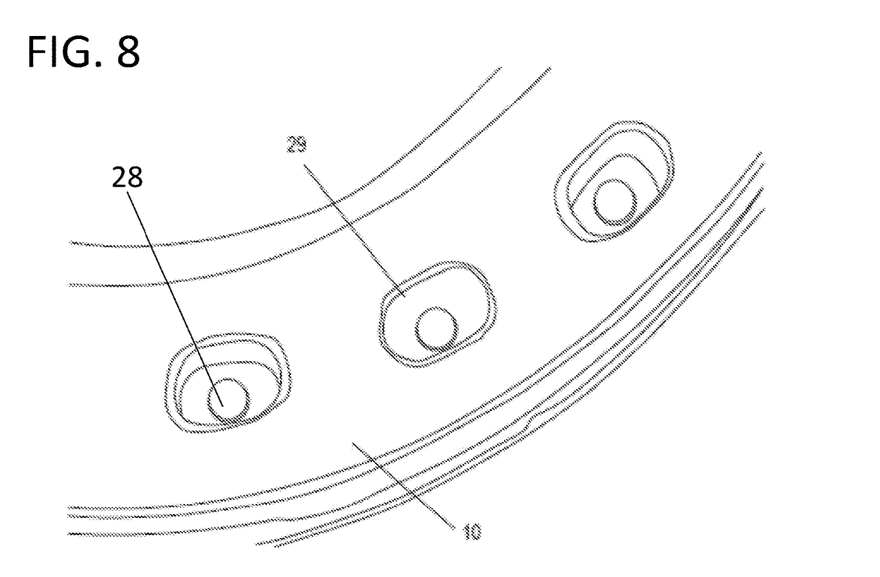
FIG. 8 shows a close-up of the lower surface of the ground contacting shoe.

Referring to FIGS. 1, 2, 3, 4, 5, 7, 8, 9a-9d, a hoof contacting shoe 20 of the cushioned horseshoe 2 has a top surface 22 that contacts the hoof 30 of the animal. The bottom surface 24 of the hoof contacting shoe 20 is in contact with the pad 15 and has an integrally formed raised portion or lock key 18 present on each of the branch's 4 quarter portion 7 and the side wall portion 6 of the hoof contacting shoe 20 and is received by the recess 14 on the ground contacting shoe 10 with pad 15. Each raised portion 18 includes tapered ends 18a that extend away from each other as the tapered ends extend away from the bottom surface 24 of the hoof contacting shoe 20 (See FIGS. 3-5 and 7). The mating of the raised portion 18 and tapered ends 18a with the recess 14 and tapered ends 14a and the pad 15 bonded therebetween ensures a minimum amount of shifting between the hoof contacting shoe 20 and the ground contacting shoe 10. More specifically, as the hoof contacting shoe 20 and ground contacting shoe 10 are mated with the flexible pad 15 bonded therebetween, the flexible pad 15 is shaped to conform with each recess 14 and tapered ends 14a and each raised portion 18 and tapered ends 18a. The hoof contacting shoe 20 also has a plurality of nail holes 26 along each branch's 4 side wall portions 6 and quarter portion 7 of the shoe to receive the body of the nails 28. Each of the plurality of nail holes 26 is formed to have a predetermined size to fully receive the body of the nail 28 t and to stop the head of the nail 28. As illustrated in FIG. 5, the ground contacting shoe 10 holes 29 are larger than the hoof contacting shoe holes 26. FIG. 7 illustrates the resting position of a nail 28 after being completed nailed into a hoof. As illustrated, the head of the nail 28 passes completely through the hole 29 and through a corresponding hole in the pad 15, and rests against the bottom surface 24 of the hoof contacting shoe 20.

It should be noted that the integrally formed recess or key 14 that is present on the quarter portion 7 and side wall portion 6 of each of the branches 4 of the ground contacting shoe 10 could be present on hoof contacting shoe 20. Similarly, an integrally formed raised portion or lock key 18 may be present on each of the branch's 4 quarter portion 7 and the side wall portion 6 of the ground contacting shoe 10. Alternatively, the ground contacting shoe 10 and the hoof contacting shoe 20 may each have an integrally formed recess or key 14 and an integrally formed raised portion or lock key 18.

The pad 15 is made of rubber or other resilient material, preferably a rubber pad having an elasticity (durometer) of approximately 40-70 Shore D. The shape of the pad 15 is substantially the same as the ground contacting shoe 10, thus also including a recess portion with tapered ends facing the bottom surface 24 of the hoof contacting shoe 20 to be in full contact with each respective raised portion 18 and corresponding tapered ends 18a, and a raised portion with tapered ends facing the top surface 12 of the ground contacting shoe 10 to be in full contact with each respective recess portion 14 and corresponding tapered ends 14a (See FIG. 7).

When the pad 15, hoof contacting shoe 20 and the ground contacting shoe 10 are assembled to form the cushioned horseshoe 2, the recessed portion 14 of ground contacting shoe 10 receives the pad 15 and the raised portion 18 of the hoof contacting shoe 20. As stated earlier, the raised portion 18 including the tapered ends 18a and the recessed portion 14 including the tapered ends 14a formed along the side wall portion 6 and the quarter portions 7 of the shoes 10, 20 decreases the amount of shifting between the two shoes 10, 20. This decrease in the amount of shifting between the two shoes 10, 20 occurs as a result of the tapered ends 18a of each raised portion 18 and corresponding tapered ends 14a of each recessed portion 14. As a result in the tapered ends 14a and 18a, the flexible pad 15 also has tapered ends that are formed as a result of being bonded between the ground contacting shoe 10 and the hoof contacting shoe 20. More specifically, as pressure is applied to the hoof contacting shoe 20 while nailed to a hoof and the ground contacting shoe 10 contacts the ground, a force pushes the shoes 10 and 20 toward each other and at an angle (forward movement of the horse). As a result of this angular force, the hoof contacting shoe 20 will shift with respect to the ground contacting shoe 10. The angles of the tapered ends 14a and 18a in parallel with each other will compress the pad 15 between these parallel facing tapered sections 14a and 18a, thus shifting the hoof contacting shoe 20 with respect to the shoe 10, since shoe 10 is set on the ground. As the pressure is released the flexible pad 15 decompresses to its original state. This movement of the shoe 20 with respect to the ground contacting shoe 10 provides a cushioned support for the hoof each time the hoof presses the shoe 20 toward the ground and toward shoe 10 at an angle.

FIG. 7 illustrates the complete assembly of the horseshoe 2, with the flexible pad 15 bonded between the hoof contacting shoe 20 and the ground contacting shoe 10. As pointed out previously, once each nail 28 is fully driven into the hoof, the thickness of the flexible pad 15 maintains the ground contacting plate 10 at a distance from the head of each nail 28. As a result, the hoof contacting shoe 20 can shift sideways with respect to the ground contacting shoe 10 without the ground contacting shoe 10 making contact with the nail 29. This provides for a cushioning effect and when the flexible pad 15 is compressed between parallel tapered ends 14a and 18a, and also prevents the ground contacting shoe 10 from contacting the nail 28, thus preventing the nails 28 from becoming jarred loose from the hoof.

Figure 9A:
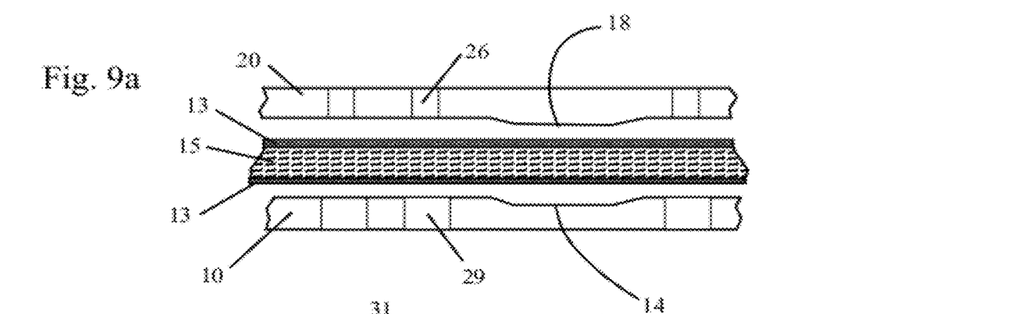
FIG. 9a shows the hoof contacting shoe, ground contacting shoe and pad prior to being placed in a mold.

FIGS. 9a-9d show different stages of production of the cushioned horseshoe 2. Referring to FIGS. 9a, the cushioned horseshoe 2 is constructed by applying an adhesive 13 on either side of the uncured pad 15 or alternatively on the top surface 12 of the ground contacting shoe 10 and the bottom surface 24 of the hoof contacting shoe 20. Then, the uncured pad 15 is aligned with the top surface 12 of the ground contacting shoe 10 and/or the bottom surface 24 of the hoof contacting shoe 20.

Figure 9B:
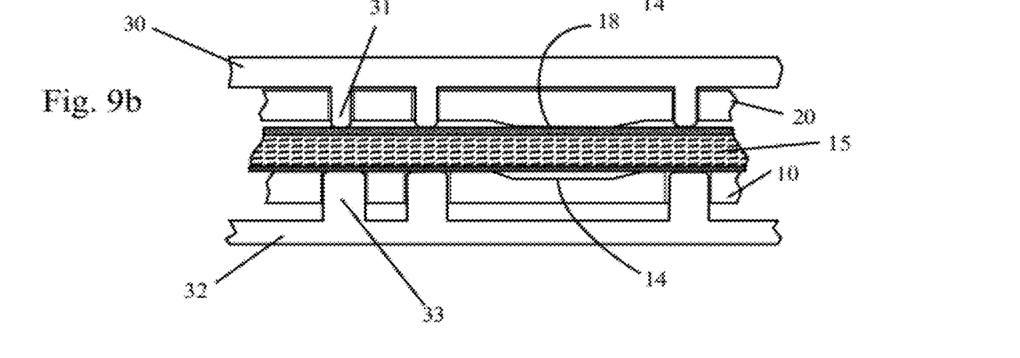
FIG. 9b shows the hoof contacting shoe, ground contacting, shoe and pad placed in a mold.

Referring to FIG. 9b, the hoof contacting shoe 20 and the ground contacting shoe 10 are each placed in molds 30, 32. Each mold has a set of pins 31, 33 respectively. It should be noted that the pins 31 of the mold 30 inserted into the hoof contacting shoe are sized to fit through holes 26. Similarly, the pins 33 of the mold 32 are sized to fit through holes 29 of the ground contacting shoe 10.

Figure 9C:
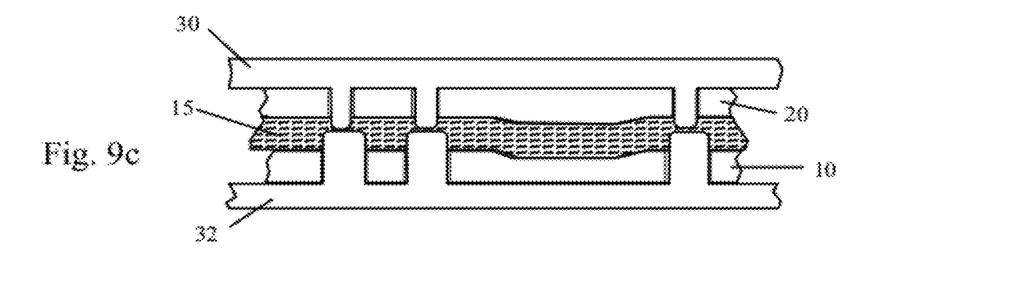
FIG. 9c shows the hoof contacting shoe, ground contacting, shoe and pad with the mold in a closed position during the curing process.

Then, as shown in FIG. 9c, the pad 15 of the cushioned horseshoe 2 is cured at specific pressure and temperature applicable to the uncured rubber pad 15 to produce a "rubber tearing bond" in which the rubber of the pad 15 will fail before the bond between rubber pad 15 and either of the shoes 10, 20 does. The "rubber tearing bond" is preferably created using a two stage chemical bond. The uncured rubber pad 15 maybe heated to approximately 225° F. and placed under 25-50 tons of pressure as an example. During the curing process, pins in the mold penetrate the rubber pad 15 and form holes in the pad. Furthermore, the rubber pad is molded to fit between the recessed portion 14 of ground contacting shoe 10 receives the pad 15 and the raised portion 18 of the hoof contacting shoe 20.

Figure 9D:
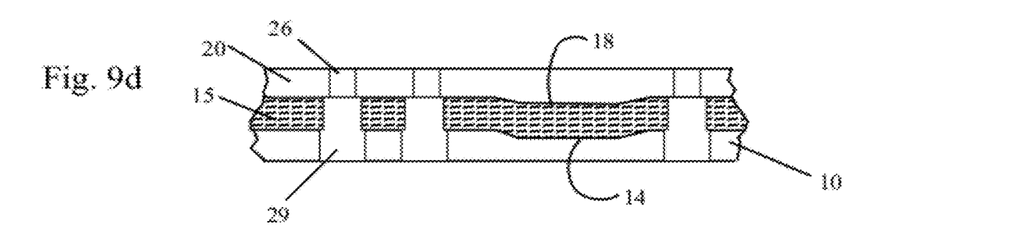
FIG. 9d shows the one piece cushioned horse shoe after the curing process.

Once the curing process is complete, the molds 30, 32 are removed as shown in FIG. 9d and holes 29 extend through the ground contacting shoe 10 through the pad to the holes 26 of the hoof contacting shoe 20. It should be noted that the head of nails 28 in the cushioned horseshoe rest within the rubber pad 15.

By curing and using adhesive to bond the hoof contacting shoe 20 to the ground contacting shoe 10, no rivets or screws, or other fastening means in which work against the shoes are present to work the cushioned horseshoe apart and the rubber pad is free to expand and contract as necessary when the animal uses the cushioned horseshoes. Furthermore, since any movement or compression of the pad takes place below the hoof, a softer rubber pad, for example below 90 Shore D may be used without having the problem of the animal working nails out of the shoe and the hoof. A steel plate may be inserted into an aluminum shoe into the toe portion of the ground contacting shoe.

The ground contact shoe 10 and the hoof contacting shoe 20 are both preferably made of aluminum or steel.

An additional lower wear surface (not shown) may be applied on the bottom surface 11 of the ground contacting shoe 10 to decrease wear for specific applications in which the animals are being used, such as for horses used on pavement. One example of a wear surface is a carbide product commonly used on machine tools, sold by Drilltec Patents & Technologies Corporation under the trademark Drilltec®, that may be brazed onto the shoe prior to the cushioned horseshoe undergoing the curing process. Alternatively, screws may be inserted into the ground contacting shoe of the cushioned horseshoe 2 after the curing process.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A cushioned horseshoe for attachment to a hoof of an animal by a plurality of nails having heads, comprising:
a U-shaped hoof contacting plate comprising:
a first branch and a second branch connected by a toe portion, the first branch and second branch each comprising a side portion adjacent the toe portion, and a quarter portion adjacent the side portion;
a top surface which contacts the hoof;
a bottom comprising an integrally formed raised portion at each of the first and second branches, the raised portions having tapered ends extending away from the bottom surface and toward each other; and
a plurality of nail holes-extending through the hoof contacting plate and having a predetermined size smaller than a size of horseshoe nail heads such that the horseshoe nail heads securely fasten the hoof contacting plate to the hoof;
a U-shaped ground contacting plate comprising:
a first branch and a second branch connected by a toe portion, the first branch and second branch each comprising a side portion adjacent the toe portion, and a quarter portion adjacent the side portion;
a top surface comprising a recessed portion formed at each of the first and second branches and positioned to receive respective raised portions of the hoof contacting plate, each recessed portion having tapered ends that extend toward each other while extending into the top surface of the plate, the tapered ends formed at an angle to be parallel with the tapered ends of the respective raised portions of the hoof contacting plate,
a bottom surface that contacts a ground surface, and a plurality of holes aligned with the nail holes in the hoof contacting plate, the plurality of holes extending through the ground contacting plate and having a size larger than the predetermined size of the holes through the hoof contacting plate such that the horseshoe nail heads pass unobstructed therethrough; and
a pad of resilient material substantially shaped the same as the top surface of the ground contacting plate, the pad including a first surface bonded to the bottom surface of the hoof contacting plate with a rubber-tearing bond and a second surface bonded to the top surface of the ground contacting plate with a rubber-tearing bond, and a plurality of holes aligned with the plurality of holes of the hoof contacting plate and the plurality of holes of the ground contacting plate, the plurality of holes having a size the same as the ground contacting plate holes such that the horseshoe nail heads pass unobstructed therethrough, the pad being formed to a predetermined thickness such that the distance between the hoof contacting plate and the ground contacting plate is greater than a height of the horseshoe nail heads to prevent the horseshoe nail heads from contacting the ground contacting plate.

2. The cushioned horseshoe of claim 1, wherein the pad is formed of rubber.

3. The cushioned horseshoe of claim 2, wherein the rubber is 40 to 70 Shore D.

4. The cushioned horseshoe of claim 1, wherein the plurality of nail holes of the hoof contacting plate are present on side wall portions of each branch of the hoof contacting plate.

5. The cushioned horseshoe of claim 1, wherein the ground contacting plate and the hoof contacting plate are made of steel.

6. The cushioned horseshoe of claim 1, wherein the ground contacting plate and hoof contacting plate are made of aluminum.

7. The cushioned horseshoe of claim 1, wherein the raised portion of the hoof contacting plate extends from the side wall portion to the quarter portion of the hoof contacting plate on the first branch and second branch of the hoof contacting plate.

8. The cushioned horseshoe of claim 1, wherein the recessed portion of the ground contacting plate extends from the side wall portion to the quarter portion of the first branch and the second branch of the ground contacting plate.

9. The cushioned horseshoe of claim 1, wherein the plurality of holes of the hoof contacting plate are spaced apart a distance extending from the quarter portion through the side wall portion on a first branch and another plurality of holes of the hoof contacting plate are spaced apart a distance extending from the quarter portion through the side wall portion on a second branch.

10. The cushioned horseshoe of claim 1, wherein the pad is substantially U-shaped.

11. The cushioned horseshoe of claim 1, wherein the hoof contacting plate is made of aluminum and the ground contacting plate is made of steel.

* * * * *